US006252739B1

(12) United States Patent
Todd et al.

(10) Patent No.: US 6,252,739 B1
(45) Date of Patent: Jun. 26, 2001

(54) COMPLIANT READ AND WRITE HEAD CLEANER

(75) Inventors: Christian A. Todd, Thornton; Lester M. Yeakley, Estes Park; John R. Anderson, Louisville, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/345,707

(22) Filed: Jun. 30, 1999

(51) Int. Cl.[7] .................................................. G11B 5/41
(52) U.S. Cl. ............................................................ 360/128
(58) Field of Search .............................................. 360/128

(56) References Cited

U.S. PATENT DOCUMENTS 6,021,026 * 2/2000 Dallago ................................. 360/128

* cited by examiner

Primary Examiner—Robert S. Tupper
(74) Attorney, Agent, or Firm—Brooks & Kushman P.C.

(57) ABSTRACT

A tape drive having a magnetic head cleaning apparatus comprising a frame, a read and write magnetic head attached to the frame, a flexure supported by the frame for relative movement between the frame and the read and write magnetic head, and a brush attached to the flexure for cleaning debris off the magnetic head. The read and write magnetic head attached to the frame is configured for reading and writing data to and from a storage medium. The flexure having the brush attached thereon moves upwardly and downwardly with respect to the frame and the read and write magnetic head to clean the magnetic head. The flexure biases the brush toward the read and write magnetic head to insure proper brush contact with the magnetic head. The tailorable compliance of the magnetic head cleaning apparatus increases the cleaning effectiveness and prolongs the life of the brush.

11 Claims, 6 Drawing Sheets

COMPLIANT READ AND WRITE HEAD CLEANER

TECHNICAL FIELD

The present invention relates to a read and write magnetic head cleaner for a tape drive. The read and write magnetic head cleaner device is integral with the tape drive and is automatically actuated to clean a read and write magnetic head.

BACKGROUND ART

A magnetic storage system such as a tape drive using magnetic tapes generally involves the problem of head contamination. Because the read and write magnetic head comes in contact with magnetic tapes the read and write magnetic head may accumulate debris. Such debris on the read and write magnetic head may cause data transfer errors. Therefore, it is desirable to subject the read and write magnetic head to periodic cleaning treatments.

Prior art devices have used methods in which the read and write magnetic head is cleaned using a separate cleaning cassette. However, these methods require the use of a device which is separate from the tape drive and must be inserted by the user. Apparent drawbacks to this method are potential loss of the cleaning cassette and inconsistent and untimely use of the cleaning cassette by the operator. Accordingly, there have been recent tape drive devices which have integrated the cleaning apparatus within the tape drive.

With reference to FIGS. 1, 2 and 3 there are illustrated a prior art automatic read and write magnetic head cleaning apparatus for a magnetic tape drive system.

FIG. 1 illustrates a known magnetic tape drive system constructed in a manner as will be described hereinafter. Read and write magnetic head 10 is mounted on base plate 12 of the magnetic tape drive system. Magnetic head 10 is mounted on the base plate 12 via a carriage 14. Carriage 14 is vertically and slidably mounted on a frame 16 by side rails (not shown).

In the above-described magnetic tape drive system the known head cleaning apparatus is constructed as will be described hereinafter. A guide post 18 is fixedly mounted at an end thereof to the base plate 12. Further, a slider 20 is slidably mounted on the guide post 18 and mechanically coupled to a drive cam 22 via a pin 52 integral to the slider 20 and a channel 48 in the drive cam 22. Drive cam 22 is rotatably mounted to the base plate 12. A brush 24 is fixed to the slider 20 by a brush holder 26. Brush 24 is in an interference condition between head 10 and slider 20.

With reference to FIGS. 1, 2 and 3 the operation of the above-known head cleaning device for a magnetic tape drive will now be described. When a magnetic storage cassette (not shown) is loaded from the tape drive system a drive train (not shown) causes the drive cam 22 to rotate clockwise. The rotation of the drive cam 22 urges the slider 20 to move downwardly causing the brush 24 to wipe across the magnetic head 10. During the unloading of a magnetic storage cassette, the drive train causes the drive cam 22 to rotate in the counterclockwise direction thus urging the slider 20 to move upwardly wiping the brush 24 across the magnetic head 10. The guidepost 18 locates the slider 20 adjacent to the drive cam 22 and the magnetic head 10. The anti-rotation portion 30 integrally connected to the slider 20 prevents the slider from rotating and decoupling from the drive cam 22.

However, the above-known magnetic head cleaning device has disadvantages as will be described hereinafter. The proximity of the brush with respect to magnetic head is critical to ensure proper cleaning. If the slider upon which the brush 24 is mounted is too close to the magnetic head 10, due to a prescribed manufacturing tolerance band for positioning of the guidepost, the drive cam, the slider and the magnetic head 10, the brush 24 will exert excessive forces against the magnetic head 10 and will cause premature wearing of the brush 24 and subsequent ineffective cleaning of the magnetic head 10. On the other hand, if the manufacturing tolerances in positioning of the various parts allow the brush 24 to be positioned too far from the magnetic head 10 ineffective cleaning of the magnetic head 10 will occur. Therefore, the known head cleaning device is not effective in cleaning the magnetic head 10. An improved magnetic head cleaning apparatus is needed to accommodate the variation in positioning of a cleaning apparatus with respect to a magnetic head due to manufacturing tolerances.

SUMMARY OF THE INVENTION

Accordingly, it is an object of the invention to provide an automatic head cleaning apparatus for a magnetic tape drive system in which a magnetic head cleaning apparatus is configured to compensate for tolerance variations, thereby increasing the effectiveness of the cleaning apparatus as well as its useful life.

In accordance with the present invention, the object mentioned above is accomplished by providing a head cleaning apparatus for a magnetic tape drive system comprising a frame, a read and write magnetic head carried by the frame, a flexure supported relative to the frame, and a brush attached to the flexure. The read and write magnetic head carried by the frame is configured for reading and writing data to and from a storage medium. The flexure is supported relative to the frame for relative movement between the frame and the read and write magnetic head. The brush is mounted to the flexure and is sufficiently biased by the flexure in the direction of the read and write magnetic head so that the brush wipes the read and write magnetic head when the flexure moves between the magnetic head and the frame.

The advantages accruing to the present invention are numerous. For example, the present invention provides a head cleaning apparatus which is compact thus requires very little space. This feature of the present invention is significant as the available space within tape drive systems is always looking to be minimized. Furthermore, the present invention does not sacrifice the cleaning function for more compact size, on the contrary, the biasing action created by the flexure insures that the proper amount of brush contact with the magnetic head is achieved, thus considerably improving the cleaning action over prior art magnetic head cleaning devices.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
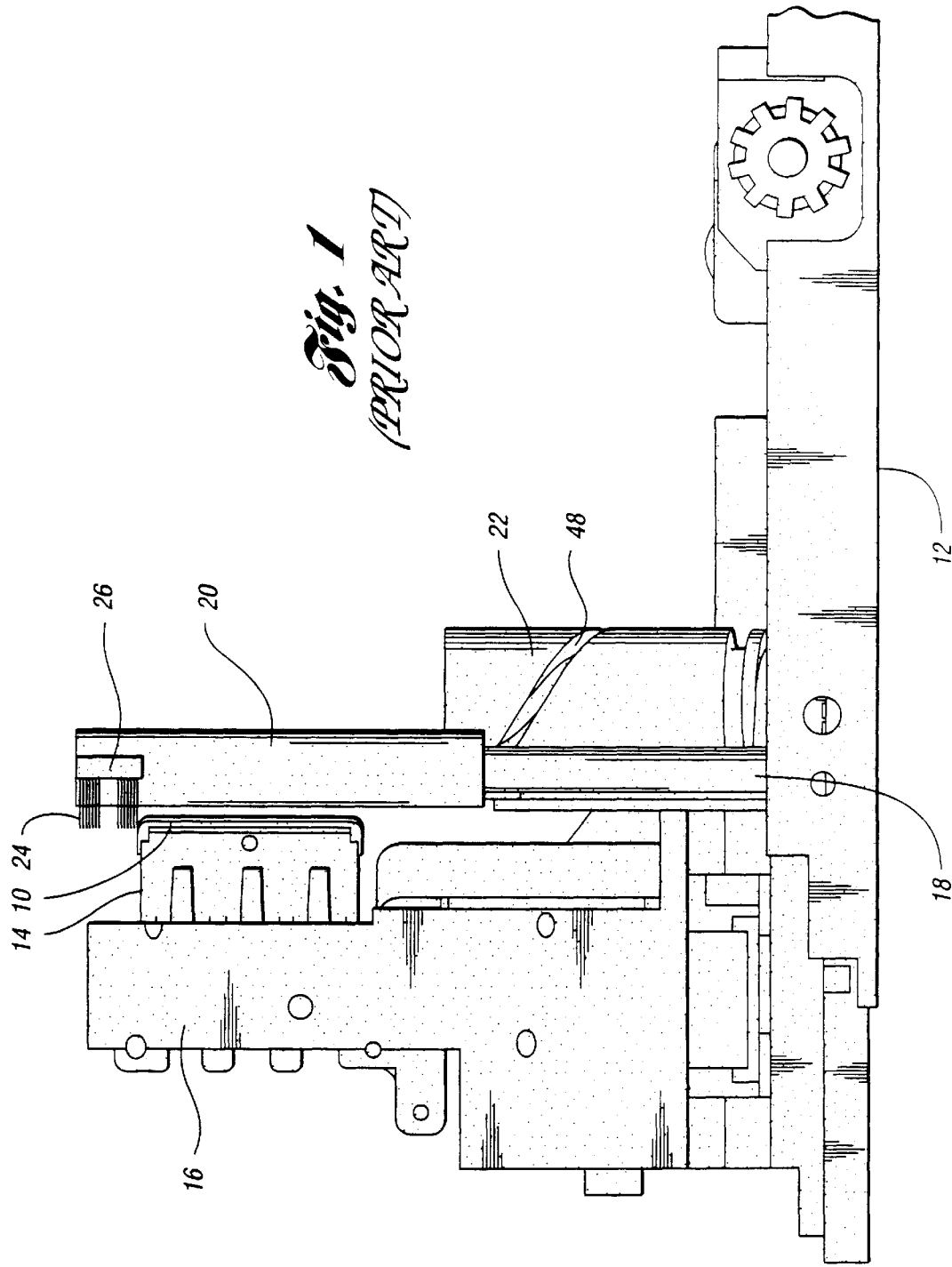
FIG. 1 is a side view showing a known read and write magnetic head cleaning apparatus for a magnetic tape drive system.
Figure 2:
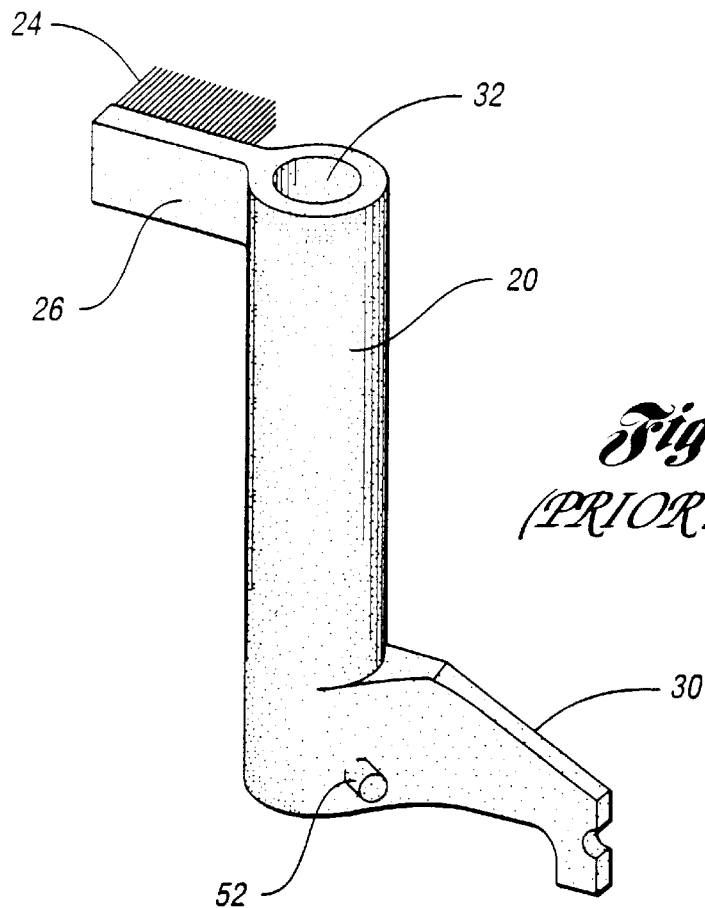
FIG. 2 is an enlarged perspective front view showing a known cleaning brush and slider of the apparatus shown in FIG. 1.
Figure 3:
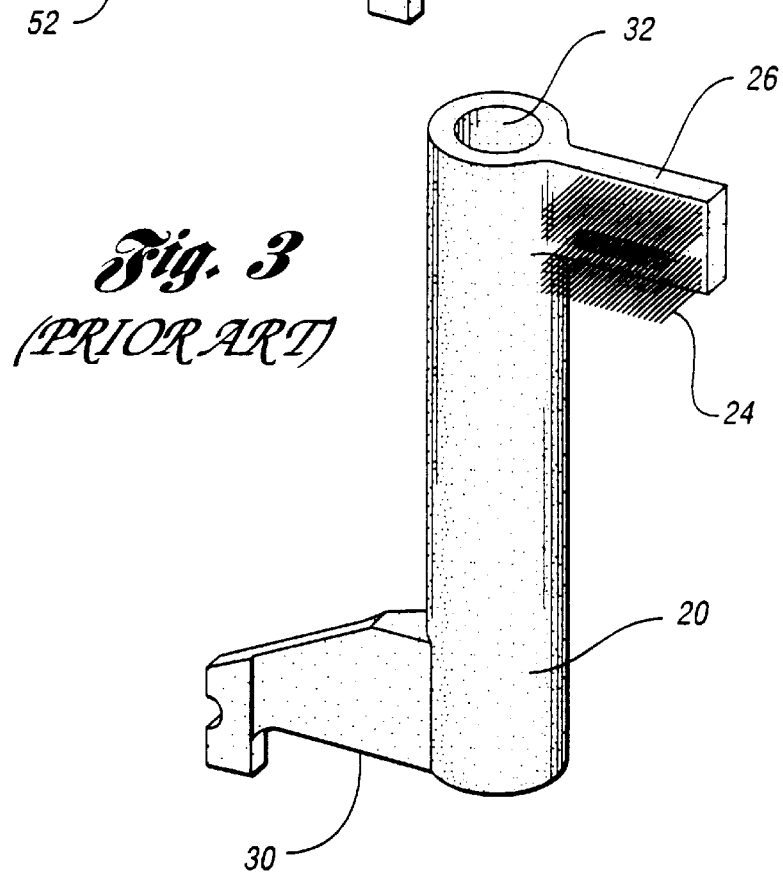
FIG. 3 is an enlarged perspective rear view showing a known cleaning brush and slider of the apparatus shown in FIG. 1.
Figure 4:
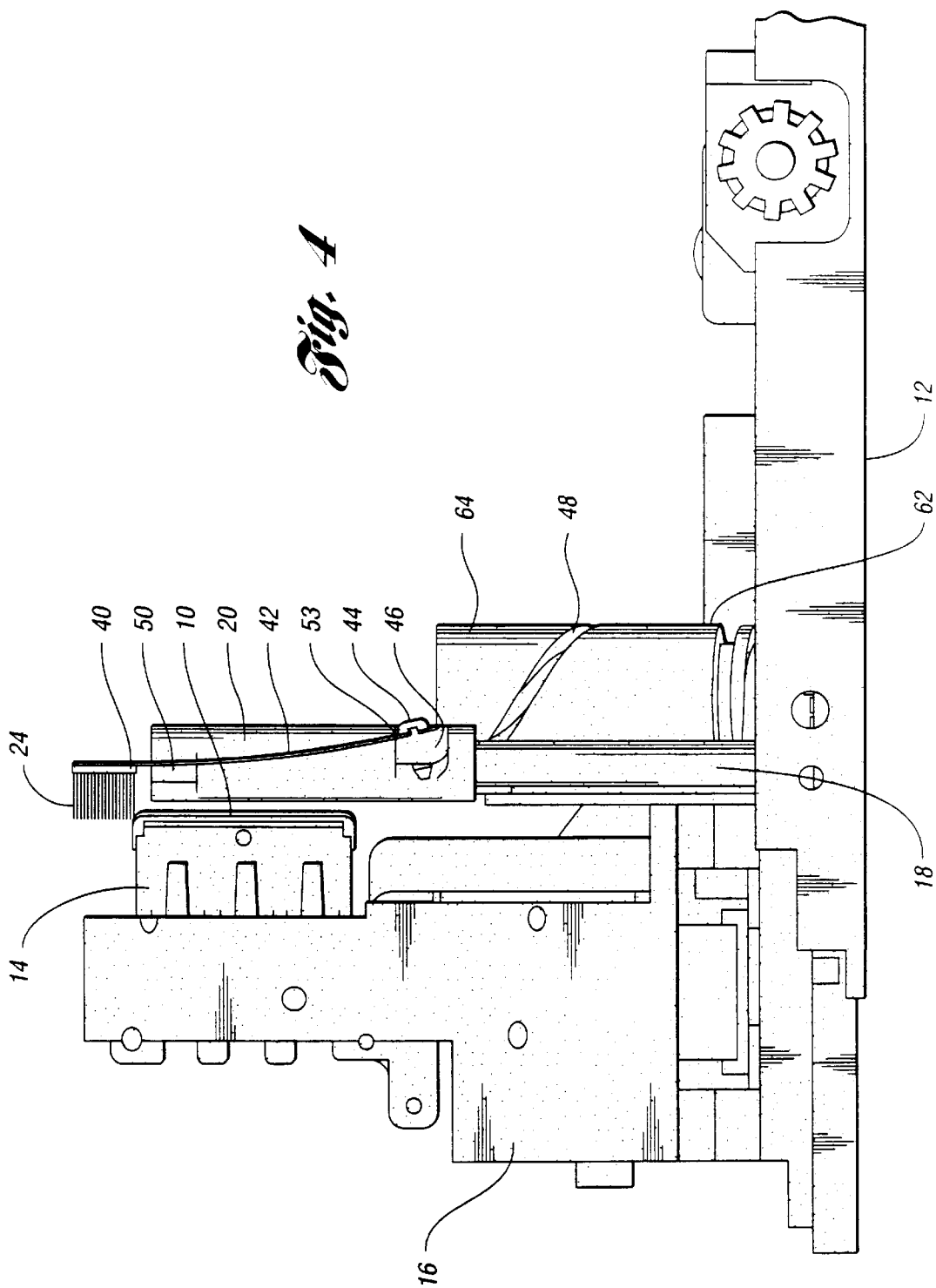
FIG. 4 is a side view of a magnetic tape drive system with a magnetic head cleaning apparatus at an end of the cleaning cycle according to the present invention.

An improved read and write magnetic head cleaning apparatus for a magnetic tape drive system according to the present invention will now be described. Reference is now made to FIGS. 4 though 9, wherein like reference numerals designate like or similar parts throughout the several views. FIG. 4 is a side view of a magnetic tape drive, according to the present invention. As shown in FIG. 4, the magnetic tape drive has a base plate 12 which supports the internal components of the magnetic tape drive system. A read and write magnetic head 10 is mounted to the base plate 12 via a carriage 14 which is slidably moveable within a frame or head actuator 16. Additional structure (not shown) is provided in the tape drive system to position a magnetic storage tape cartridge containing a magnetic data storage tape adjacent to the read and write magnetic head 10. Electronic data is transferred to and from the magnetic storage tape by the read and write magnetic head 10.

The tape drive system is constructed to be used with a computer system (not shown). Typically, the tape drive system is used to back up computer memory, such as, the random access memory of a hard disk drive and other such computer memory. The tape drive system may be internally mounted within the computer system or external to the computer system and connected to the computer system via serial, parallel, universal serial bus ports or a tape library and the like.

Figure 7:
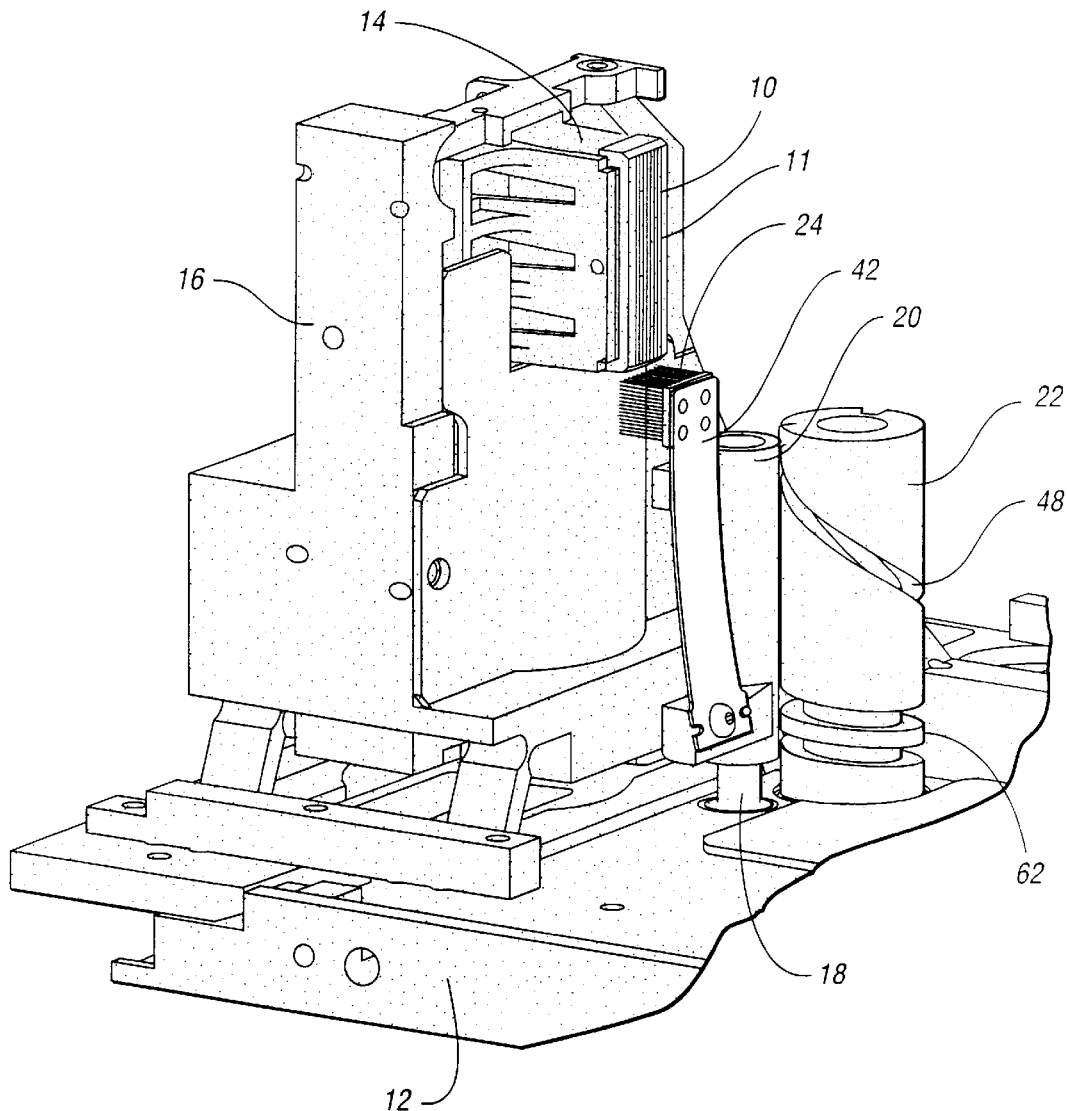
FIG. 7 is a perspective view of the magnetic tape drive system with a magnetic head cleaning apparatus at an end of the cleaning cycle according to the present invention.

A cleaning apparatus having a guide member such as guidepost 18, a brush support member such as slider 20, a drive member such as drive cam 22 and a brush 24 is provided to wipe particulates and debris from the read and write magnetic head 10 and the vertical gutters 11 (shown in FIG. 7). The guidepost 18 is rigidly mounted on the base plate 12 and receives a slider 20 through an aperture 32 disposed in the slider 20 allowing the slider 20 to slide upwardly and downwardly on the guidepost 18. Positioned adjacent to the guidepost 18 is the drive cam 22. The drive cam 22 is fixedly and rotatably secured to the base plate 12. Brush 24 is composed of 0.002 diameter Nylon fibers and suffused with carbon for conductivity. Brush 24 is fixed to a brush holder 40 by a bonding agent such as a conductive glue or by similar means. The brush holder 40 is preferably heat staked or conductively bonded to a resilient member such as flexure 42. The flexure 42 is made of a resilient material and is configured to bias the brush 24 against the magnetic head 10.

The slider 20, the flexure 42, the guidepost 18, the base plate 12, and the respective bonding agents are made from conductive materials and are grounded to eliminate the problem of static discharge and associated magnetic head damage. The rubbing action of the brush against the magnetic head and the slider against the post causes a static charge to build up and if not for the use of conductive materials and grounding of the various components the magnetic head would be damaged.

Figure 5:
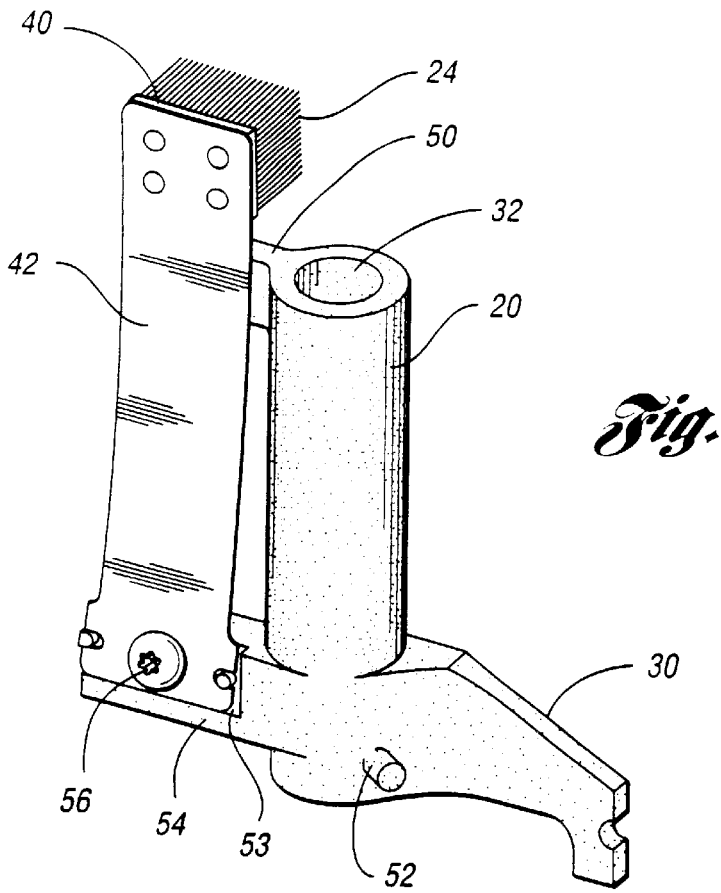
FIG. 5 is an enlarged perspective front view of a magnetic head cleaning apparatus for the magnetic tape drive system shown in FIG. 4 according to the present invention.
Figure 6:
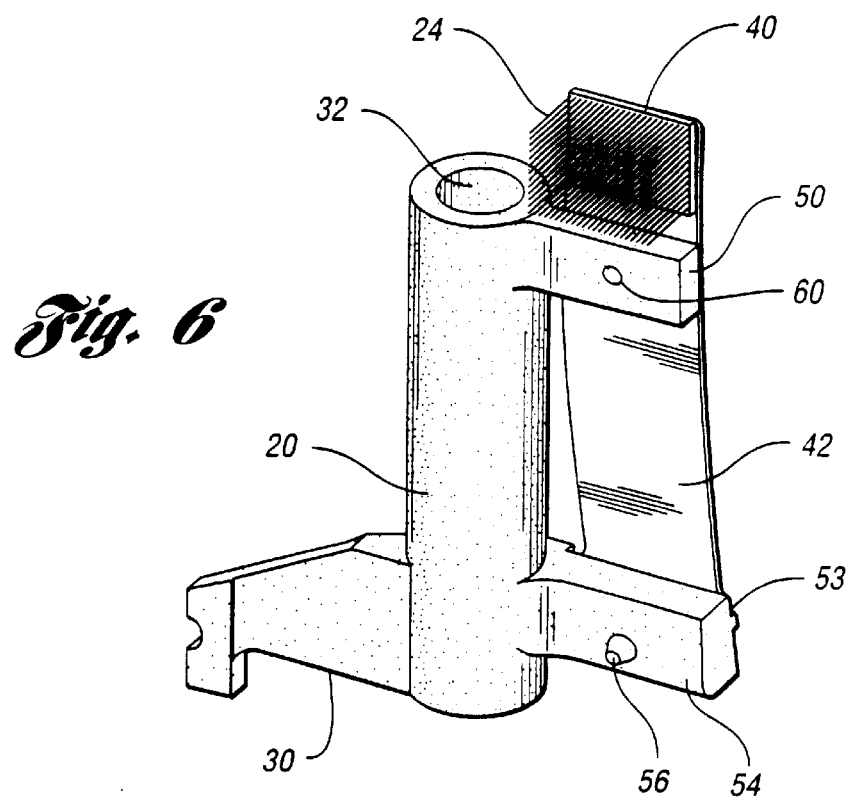
FIG. 6 is an enlarged perspective rear view showing a magnetic head cleaning apparatus for the magnetic tape drive system shown in FIG. 4 according to the present invention.

Referring now to FIGS. 5 and 6, a more detailed view of how the brush 24 and the flexure 42 are mounted to the slider 20. The flexure 42, which is comprised preferably of half-hard 300 series stainless steel or similar flexible material, is mounted to the slider 20 at a lower arm portion 54. The lower arm portion 54 is integral to the slider 20. Preferably, flexure 42 is mounted to the lower arm portion 54 via a screw 56. The screw preferably is a 0-80 Plastite screw or other sufficient mechanical coupling means. The brush 24 is pre-loaded against the magnetic head 10 by providing a slanted surface 53 in the lower arm portion 54 where the flexure 42 is initially flat. The surface is slanted at an angle to produce a radius of curvature in the flexure 42. Flexure 42 has a preferred radius of curvature of approximately four inches, to preload the brush 24 against the magnetic head 10.

A stop 50 which is integrally connected to the slider 20 contacts the flexure 42 and provides a means to limit motion of brush 24 toward the read and write head. In one embodiment, stop 50 is adjustable by using a threaded aperture 60 and a screw (not shown) wherein the screw is threaded into or out of the aperture 60 causing the flexure to move closer or farther away from the stop 50. The movement of the screw in the aperture 60 establishes a nominal engagement of the brush 24 with the magnetic head 10. The adjustable stop adds another level of flexibility and control to the read and write head cleaning apparatus further increasing the effectiveness of the read and write magnetic head cleaning.

Referring now to FIGS. 4–7, the operation of the cleaning apparatus is more clearly illustrated. Over a period of time, debris will accumulate on the read and write magnetic head 10 and in the vertical gutters 11 (shown in FIG. 7), if left unattended, the contamination will degrade the data transfer performance of the read and write magnetic head. More specifically, the vertical gutters will become clogged with contaminates preventing the air trapped between the magnetic head 10 and the magnetic storage tape from bleeding off. If the air between the magnetic head and the magnetic tape is not bled off then the magnetic tape will fly over the magnetic head instead of contacting the magnetic head causing data transfer losses. The brushing action created by wiping the brush 24 across the face and within the vertical gutters 11 of the read and write magnetic head 10 will effectively eliminate this contamination problem and associated data transfer losses. The brush 24 wipes across the read and write magnetic head 10 surface only upon loading and unloading of a magnetic storage tape cartridge (not shown).

A complete cleaning cycle for the cleaning apparatus will be described hereinafter. FIG. 4 shows the brush 24 at the beginning of the cleaning cycle wherein the brush is raised above the read and write magnetic head 10. When a magnetic storage tape cartridge is introduced into the tape drive, a gear train (not shown) mechanically coupled to the magnetic storage tape loading mechanism (not shown) and to the drive cam 22, rotates the drive cam 22 in a clockwise direction which in turn urges the slider 20 to move downward by virtue of the cooperation of a follower 52 on the slider 20 (shown in FIG. 5) with a spiral channel 48 on the surface of the drive cam 22. More specifically, follower 52 being slidable within the channel 48 is constrained to move along the channel path as the drive cam 22 rotates. As the drive cam 22 continues to rotate clockwise, the brush 24 wipes across the read and write head 10 until the follower 52 reaches the bottom end 62 of the drive cam 22. When the follower 52 has reached the bottom end 62, the cleaning apparatus has completed one full cleaning cycle as shown in FIG. 7.

When a magnetic storage tape cartridge (not shown) is unloaded from the tape drive system, the drive cam 22 is rotated counterclockwise by the gear train (not shown). The counterclockwise rotation of the drive cam 22 causes the follower 52 to move up the channel 48 which in turn urges the slider 20 and the brush 24 to move upwardly. When the follower 52 reaches the top end 64 of the drive cam 22, the cleaning apparatus has again completed one cleaning cycle as shown in FIG. 4.

Figure 8:
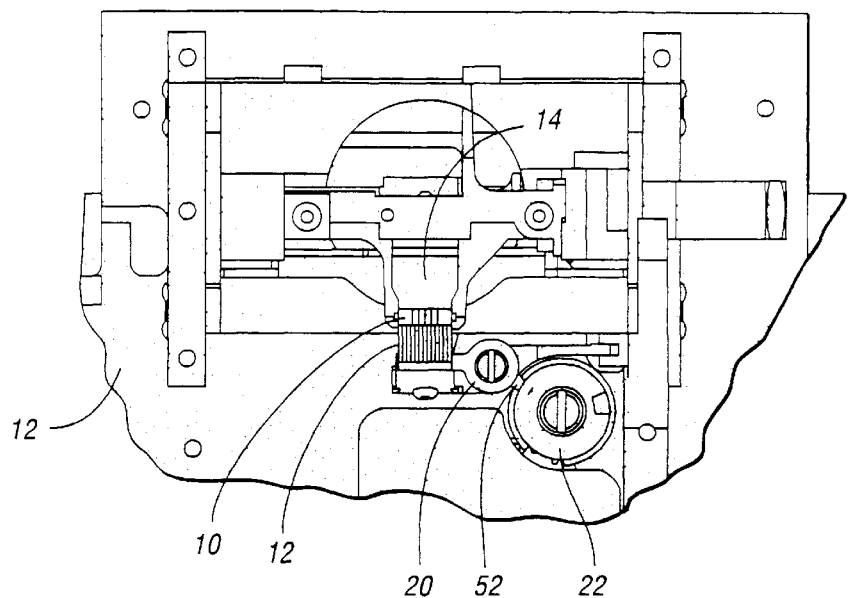
FIG. 8 is a plan view of the magnetic tape drive system with a magnetic head cleaning apparatus according to the present invention.
Figure 9:
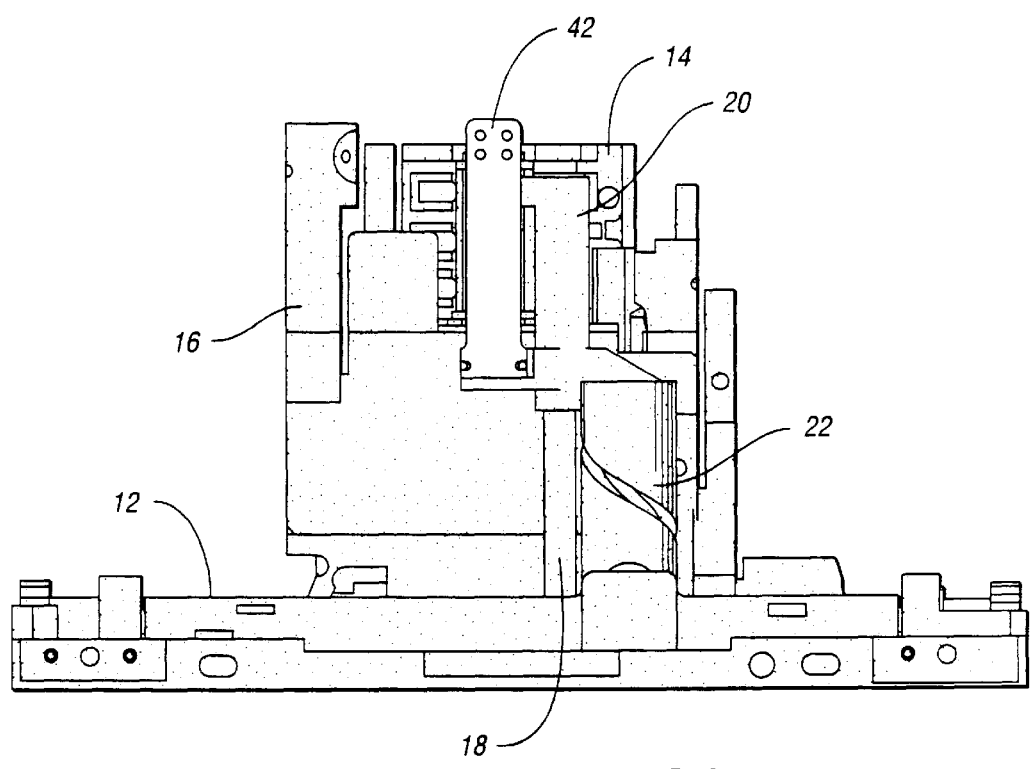
FIG. 9 is a front view of the magnetic tape drive system with a magnetic head cleaning apparatus according to the present invention.

With continuing reference to FIGS. 8 and 9, a plan view and a front view, respectively, of the tape drive system according to the present invention are illustrated. As shown the brush 24 is in contact with the head 10 and is in a position to effectively clean debris and contaminants from the head 10. As shown, the slider 20 disposed on the guidepost 18 is disposed in a parallel arrangement with the drive cam 22. Manufacturing variations in positioning the slider 20 with respect to the head 10 could cause the cleaning action of the brush 24 to be ineffective as seen in the prior art. The present invention eliminates this problem by absorbing manufacturing variations through the use of the flexure 42. In other words, if excessive interference between the brush 24 and the magnetic head 10 occurs due to manufacturing variations, the flexure will allow the brush 24 to move away from the read and write magnetic head 10 thus prolonging the life of the brush 24 by reducing forces between the head and the brush. The prior art cleaning apparatus, however, was unable to alleviate the excessive forces between the magnetic head and the brush consequently ineffective magnetic head cleaning was occurring and the life of the brush 24 was shortened.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a tape drive for transferring data to and from a storage media, the tape drive comprising:
   a frame;
   a read and write magnetic head supported by the frame for reading and writing data from and to the storage media;
   a drive member proximate to the read and write magnetic head and movable relative to the frame;
   a brush support member movable relative to the frame and in a driven relationship relative to the drive member, wherein the movement of the drive member drives the brush support member for movement relative to the frame and the magnetic head, wherein the brush support member includes a lower arm portion having a slanted surface;
   a flexure having a fixed end affixed to the slanted surface of the lower arm portion of the brush support member and a free end movable relative to the brush support member, wherein the movement of the brush support member in response to being driven by the drive member drives the flexure for movement relative to the frame and the magnetic head; and
   a brush mounted on the free end of the flexure sufficiently biased by the flexure in the direction of the magnetic head so that the brush wipes the read and write magnetic head when the brush support member is driven by the drive member.

2. The tape drive according to claim 1 wherein the drive member is a drive cam which is rotatably fixed to the frame and mechanically coupled to the flexure.

3. The tape drive according to claim 1 wherein the brush support member has an integrally attached pin which is in slidable engagement with a channel on the drive member.

4. The tape drive according to claim 1 further comprising a guide member supported by the frame adjacent to the magnetic head for directing the movement of the flexure relative to the magnetic head.

5. The tape drive according to claim 4 wherein the guide member is mechanically coupled to the drive member supported by the frame adjacent to the magnetic head for directing the movement of the flexure relative to the magnetic head.

6. The tape drive according to claim 1 wherein the brush wipes the read and write magnetic head during loading and unloading of the storage media.

7. The tape drive according to claim 1 further comprising a holder for gripping the brush wherein the holder is affixed to the free end of the flexure.

8. The tape drive according to claim 1 wherein the flexure forms a radius between 2 and 6 inches.

9. The tape drive according to claim 1 wherein the brush support member includes a stop which prevents forward movement of the free end of the flexure.

10. The tape drive according to claim 9 wherein the stop is positionable in a plurality of locations relative to the read and write magnetic head.

11. The tape drive according to claim 1 wherein the brush is comprised of a plurality of nylon fibers suffused with carbon.

* * * * *